US009558007B2

(12) United States Patent
Maity et al.

(10) Patent No.: US 9,558,007 B2
(45) Date of Patent: Jan. 31, 2017

(54) OUT-OF BAND CONFIGURATION OF BIOS SETTING DATA

(71) Applicant: AMERICAN MEGATRENDS, INC., Norcross, GA (US)

(72) Inventors: Sanjoy Maity, Snellville, GA (US); Baskar Parthiban, Johns Creek, GA (US); Satheesh Thomas, Norcross, GA (US); Purandhar Nallagatla, Johns Creek, GA (US); Harikrishna Doppalapudi, Norcross, GA (US); Ramakoti Reddy Bhimanadhuni, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 396 days.

(21) Appl. No.: 14/107,008

(22) Filed: Dec. 16, 2013

(65) Prior Publication Data
US 2015/0169330 A1 Jun. 18, 2015

(51) Int. Cl.
G06F 9/44 (2006.01)
H04L 12/24 (2006.01)
G06F 9/445 (2006.01)

(52) U.S. Cl.
CPC ............ G06F 9/4401 (2013.01); G06F 8/665 (2013.01); H04L 41/0813 (2013.01)

(58) Field of Classification Search
CPC ................. G06F 9/4401; G06F 8/665
See application file for complete search history.

(56) References Cited

U.S. PATENT DOCUMENTS

| 2009/0113198 A1* | 4/2009 | Liu ...................... H04L 41/0803 713/2 |
| 2011/0255593 A1* | 10/2011 | Weinstock ............ G06F 3/1462 375/240.2 |
| 2014/0052552 A1* | 2/2014 | Truong ................. G07G 1/0009 705/18 |

* cited by examiner

Primary Examiner — Paul Yanchus, III
Assistant Examiner — Vincent Chang
(74) Attorney, Agent, or Firm — Locke Lord LLP; Tim Tingkang Xia, Esq.

(57) ABSTRACT

In certain aspects, a system for out-of-band configuring BIOS setting data (BIOSSD) includes a host computer and a service processor (SP). The SP stores a BIOSSD collection and a human interface data (HID) collection. The HID collection includes questions for data of the BIOSSD collection and corresponding options for each question. When a remote management computer sends to the SP an information request, the SP retrieves the HID collection and transmits the questions and the corresponding options to the remote management computer. In response to a command indicating a selected corresponding option, the SP changes corresponding data of the BIOSSD collection according to the command. When the BIOS executed at the host computer issues a BIOSSD update request to the SP, the SP transmits a copy of the BIOSSD collection to the BIOS chip of the host computer to replace the BIOSSD collection stored in the BIOS chip.

26 Claims, 8 Drawing Sheets

OUT-OF BAND CONFIGURATION OF BIOS SETTING DATA

FIELD

The present disclosure relates generally to updating basic input/output system (BIOS) setting data, and particularly to system and method for out-of-band (OOB) configuration of BIOS setting data.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The Basic Input/Output System (BIOS) is one of the most crucial components on a computer motherboard. The BIOS software is preloaded into a memory (the BIOS memory) of the BIOS, and typically is the first code run by a computer when powered on. When the computer starts up, the first job for the BIOS is the power-on self-test, which initializes and identifies the system devices such as the CPU, RAM, video display card, keyboard and mouse, hard disk drive, optical disc drive and other hardware. The BIOS then locates a boot loader software held on a peripheral device (designated as a "boot device"), such as a hard disk or a CD/DVD, and loads and executes that software, giving it control of the operating system (OS). This process is known as booting, or booting up, which is short for bootstrapping.

Generally, the BIOS may have a number of settings that can be configured by a user of the computer. The BIOS provides console access for a user to modify the configuration of the BIOS settings during the startup of the host computer. The host computer may provide with applications to update the BIOS settings from the operating systems. For example, the host computer may include an application to switch the CPU of the host computer from a protected mode, which is a normal operation mode, to a system management mode (SMM), which is a special management mode.

However, in certain occasions, there is a need for the user of the host computer to configure the BIOS settings without entering the management mode. For example, when the user connects to the host computer from a remote client device and attempts to change the BIOS settings remotely, the user may not want to interrupt the operation of the host computer.

Therefore, an unaddressed need exists in the art to address the aforementioned deficiencies and inadequacies.

SUMMARY

Certain aspects of the present disclosure direct to a system for out-of-band configuring BIOS setting data (BIOSSD). In certain embodiments, the system includes: a host computer, including a BIOS chip, wherein the BIOS chip stores a first BIOSSD collection; a service processor (SP), connected to the host computer via an interface, wherein the SP includes a non-volatile memory storing a firmware, a second BIOSSD collection, and a human interface data (HID) collection, wherein the second BIOSSD collection includes a plurality of data, and, the HID collection includes a plurality of questions for the data of the second BIOSSD collection and a plurality of corresponding options for each question; and a remote management computer connected to the SP via a network. The firmware is configured, when executed, to: receive a connection request from the remote management computer to establish a network connection; in response to the connection request, transmit a response message to the remote management computer via the network to establish the network connection; receive an information request from the remote management computer for the questions and the corresponding options of the HID collection; in response to the information request, retrieve the questions and the corresponding options from the HID collection, and transmit the retrieved questions and corresponding options to the remote management computer via the network; receive a command from the remote management computer indicating a selected corresponding option; in response to the command, change one of the data of the second BIOSSD collection according to the selected corresponding option indicated by the command; and in response to a BIOSSD update request from the host computer, transmit a copy of the second BIOSSD collection to the BIOS chip via the interface to replace the first BIOSSD collection in the BIOS chip.

In certain embodiments, the BIOS chip stores a BIOS, configured to send the BIOSSD update request to the SP for the second BIOSSD collection.

In certain embodiments, the BIOS chip stores a BIOS HID collection, wherein the BIOS HID collection is an exact copy of the HID collection.

In certain embodiments, the remote management computer includes a remote user interface (UI) configured to: send the connection request to the SP via the network; receive the response message from the SP via the network to establish the network connection; send the information request to the SP via the network; receive the retrieved questions and corresponding options from the SP via the network; display the received questions and corresponding options at the remote management computer; receive the selected corresponding option at the remote management computer; and send the command from the remote management computer indicating a selected corresponding option.

In certain embodiments, the remote UI is a browser program, a telnet client program, a secure shell (SSH) client program, or a common information model (CIM) interface client program.

In certain embodiments, the firmware includes a UI server module configured, when executed, to: receive the connection request from the remote UI via the network; in response to the connection request, transmit the response message to the remote UI via the network; receive the information request from the remote UI via the network for the questions and the corresponding options of the HID collection; in response to the information request, retrieve the questions and the corresponding options from the HID collection, and transmit the retrieved questions and corresponding options to the remote UI via the network; receive the command from the remote UI via the network indicating the selected corresponding option; and in response to the command, change the one of the data of the second BIOSSD collection according to the selected corresponding option indicated by the command.

In certain embodiments, the UI server module is a web server program, a telnet server program, a secure shell (SSH) server program, or a common information model (CIM) interface server program.

In certain embodiments, the firmware includes a BIOSSD update module configured, when executed, to: in response to the BIOSSD update request from the host computer, transmit a copy of the second BIOSSD collection to the BIOS chip via the interface to replace the first BIOSSD collection in the BIOS chip.

In certain embodiments, the interface is a keyboard controller style (KCS) interface or a universal serial bus (USB) interface.

In certain embodiments, the SP is a baseboard management controller (BMC).

Certain aspects of the present disclosure direct to a method of out-of-band configuring BIOS setting data (BIOSSD), including: receiving, at a service processor (SP), a connection request from a remote management computer to establish a network connection, wherein the remote management computer is connected to the SP via a network, and the SP is connected to a host computer via an interface; in response to the connection request, transmitting, at the SP, a response message to the remote management computer via the network to establish the network connection; receiving, at the SP, an information request from the remote management computer for a plurality of questions and a plurality of corresponding options for each question of a human interface data (HID) collection, wherein the host computer comprises a BIOS chip storing a first BIOSSD collection, wherein the SP stores a second BIOSSD collection and the HID collection, wherein the second BIOSSD collection comprises a plurality of data, and the HID collection comprises the plurality of questions for the data of the second BIOSSD collection and the corresponding options for each question; in response to the information request, retrieving, at the SP, the questions and the corresponding options from the HID collection, and transmitting the retrieved questions and corresponding options to the remote management computer via the network; receiving, at the SP, a command from the remote management computer indicating a selected corresponding option; in response to the command, changing, at the SP, one of the data of the second BIOSSD collection according to the selected corresponding option indicated by the command; and in response to a BIOSSD update request from the host computer, transmitting, at the SP, a copy of the second BIOSSD collection to the BIOS chip of the host computer via the interface to replace the first BIOSSD collection in the BIOS chip.

In certain embodiments, the BIOS chip stores a BIOS, configured to send the BIOSSD update request to the SP for the second BIOSSD collection.

In certain embodiments, the BIOS chip stores a BIOS HID collection, wherein the BIOS HID collection is an exact copy of the HID collection.

In certain embodiments, the remote management computer includes a remote user interface (UI) configured to: send the connection request to the SP via the network; receive the response message from the SP via the network to establish the network connection; send the information request to the SP via the network; receive the retrieved questions and corresponding options from the SP via the network; display the received questions and corresponding options at the remote management computer; receive the selected corresponding option at the remote management computer; and send the command from the remote management computer indicating a selected corresponding option.

In certain embodiments, the remote UI is a browser program, a telnet client program, a secure shell (SSH) client program, or a common information model (CIM) interface client program.

In certain embodiments, the SP stores a UI server module configured, when executed, to: receive the connection request from the remote UI via the network; in response to the connection request, transmit the response message to the remote UI via the network; receive the information request from the remote UI via the network for the questions and the corresponding options of the HID collection; in response to the information request, retrieve the questions and the corresponding options from the HID collection, and transmit the retrieved questions and corresponding options to the remote UI via the network; receive the command from the remote UI via the network indicating the selected corresponding option; and in response to the command, change the one of the data of the second BIOSSD collection according to the selected corresponding option indicated by the command.

In certain embodiments, the UI server module is a web server program, a telnet server program, a secure shell (SSH) server program, or a common information model (CIM) interface server program.

In certain embodiments, the interface is a keyboard controller style (KCS) interface or a universal serial bus (USB) interface.

In certain embodiments, the SP is a baseboard management controller (BMC).

Certain aspects of the present disclosure direct to a non-transitory computer readable medium storing computer executable codes. The codes, when executed at a processor, are configured to: receive, at a service processor (SP), a connection request from a remote management computer to establish a network connection, wherein the remote management computer is connected to the SP via a network, and the SP is connected to a host computer via an interface; in response to the connection request, transmit, at the SP, a response message to the remote management computer via the network to establish the network connection; receive, at the SP, an information request from the remote management computer for a plurality of questions and a plurality of corresponding options for each question of a human interface data (HID) collection, wherein the host computer comprises a BIOS chip storing a first BIOSSD collection, wherein the SP stores a second BIOSSD collection and the HID collection, wherein the second BIOSSD collection comprises a plurality of data, and the HID collection comprises the plurality of questions for the data of the second BIOSSD collection and the corresponding options for each question; in response to the information request, retrieve, at the SP, the questions and the corresponding options from the HID collection, and transmit the retrieved questions and corresponding options to the remote management computer via the network; receive, at the SP, a command from the remote management computer indicating a selected corresponding option; in response to the command, change, at the SP, one of the data of the second BIOSSD collection according to the selected corresponding option indicated by the command; and in response to a BIOSSD update request from the host computer, transmit, at the SP, a copy of the second BIOSSD collection to the BIOS chip of the host computer via the interface to replace the first BIOSSD collection in the BIOS chip.

In certain embodiments, the BIOS chip stores a BIOS, configured to send the BIOSSD update request to the SP for the second BIOSSD collection.

In certain embodiments, the BIOS chip stores a BIOS HID collection, wherein the BIOS HID collection is an exact copy of the HID collection.

In certain embodiments, the remote management computer includes a remote user interface (UI) configured to: send the connection request to the SP via the network; receive the response message from the SP via the network to establish the network connection; send the information request to the SP via the network; receive the retrieved questions and corresponding options from the SP via the network; display the received questions and corresponding options at the remote management computer; receive the selected corresponding option at the remote management computer; and send the command from the remote management computer indicating a selected corresponding option.

In certain embodiments, the remote UI is a browser program, a telnet client program, a secure shell (SSH) client program, or a common information model (CIM) interface client program.

In certain embodiments, the codes include a UI server module configured, when executed, to: receive the connection request from the remote UI via the network; in response to the connection request, transmit the response message to the remote UI via the network; receive the information request from the remote UI via the network for the questions and the corresponding options of the HID collection; in response to the information request, retrieve the questions and the corresponding options from the HID collection, and transmit the retrieved questions and corresponding options to the remote UI via the network; receive the command from the remote UI via the network indicating the selected corresponding option; and in response to the command, change the one of the data of the second BIOSSD collection according to the selected corresponding option indicated by the command;

In certain embodiments, the UI server module is a web server program, a telnet server program, a secure shell (SSH) server program, or a common information model (CIM) interface server program.

In certain embodiments, the codes include a BIOSSD update configured, when executed, to: in response to the BIOSSD update request from the host computer, transmit a copy of the second BIOSSD collection to the BIOS chip via the interface to replace the first BIOSSD collection in the BIOS chip.

In certain embodiments, the interface is a keyboard controller style (KCS) interface or a universal serial bus (USB) interface.

In certain embodiments, the SP is a baseboard management controller (BMC).

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
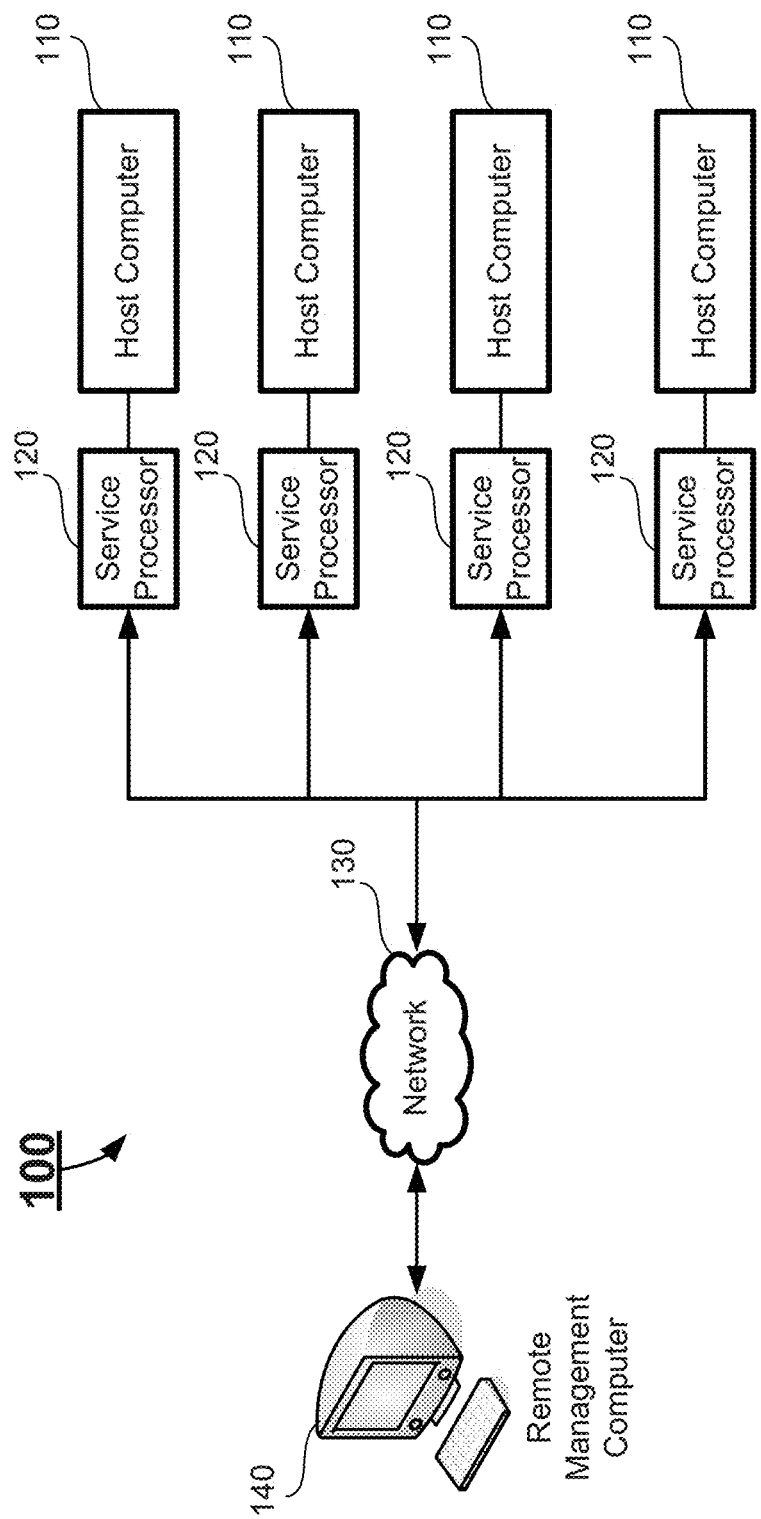
FIG. 1 schematically depicts a client-server system having a plurality of host computers according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

FIG. 1 schematically depicts a client-server system according to certain embodiments of the present disclosure. As shown in FIG. 1, the system 100 includes one or more host computers 110, and each host computer 110 has a service processor (SP) 120. The SP 120 of each host computer 110 is respectively connected to a remote management computer 140 via a network 130. The system 100 can be a system that incorporates more than one interconnected system, such as a client-server network. The network 130 may be a wired or wireless network, and may be of various forms such as a local area network (LAN) or wide area network (WAN) including the Internet. In certain embodiments, the system 100 may include other physical or virtual components not shown in FIG. 1.

Figure 2A:
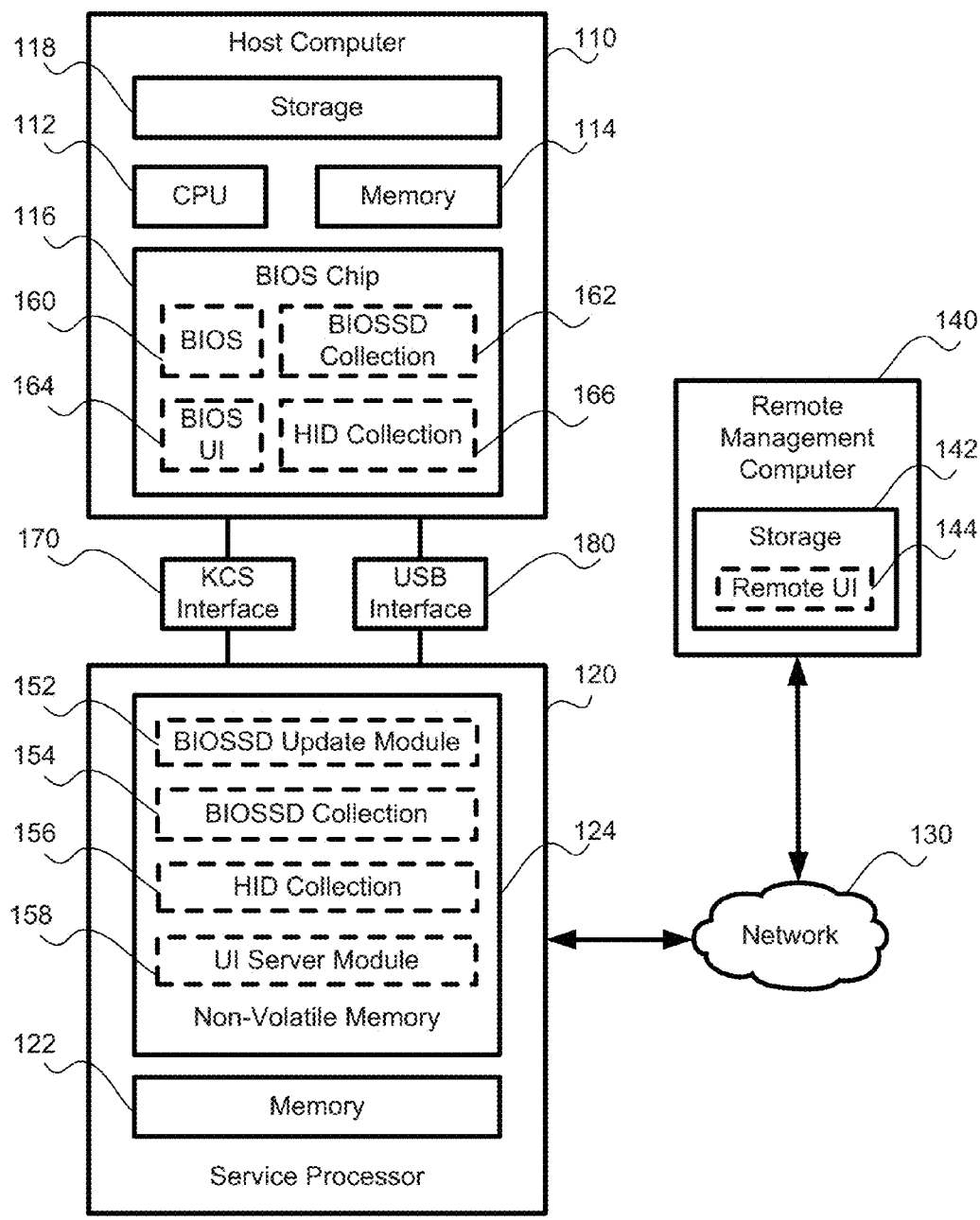
FIG. 2A schematically depicts a host computer and a service processor of the system according to certain embodiments of the present disclosure.

FIG. 2A schematically depicts a host computer and a service processor according to certain embodiments of the present disclosure. As shown in FIG. 2A, the SP 120 is connected to the host computer 110 via a keyboard controller style (KCS) interface 170 and a universal serial bus (USB) interface 180. In certain embodiments, the SP 120 may be connected to the host computer 110 via only one interface. For example, the SP 120 may be connected to the host computer 110 via the KCS interface 170 only, or via the USB interface 180 only.

The host computer 110 may be a general purpose computer system or a headless computer system. As shown in FIG. 2A, the host computer 110 includes a baseboard or the "motherboard" (not shown) and a storage 118.

The baseboard is a printed circuit board to which a multitude of components or devices may be connected by way of a system bus or other electrical communication paths. Although not explicitly shown in FIG. 2A, the components on the baseboard are interconnected, and the layout of the components on the baseboard and the manner of the interconnection between the components on the baseboard is herein referred to as the configuration of the baseboard. One of ordinary skill in the art would appreciate that the configuration of the baseboard may be adjusted or changed according to the necessary design or manufacturing requirements.

The components on the baseboard of the host computer 110 include, but not limited to, a central processing unit (CPU) 112, a memory 114, a BIOS chip 116, and other required memory and Input/Output (I/O) modules (not shown). The SP 120 may also be a component on the baseboard. In certain embodiments, the CPU 112, the memory 114, the BIOS chip 116 and the SP 120 may be embedded on the baseboard, or may be connected to the baseboard through an interface. In certain embodiments, the interface may be physical hardware interface such as electrical connectors, buses, ports, cables, terminals, or other I/O devices. Further, the host computer 110 includes a storage 118, which is a data storage media for storing the OS (not shown) and other applications of the host computer 110.

The CPU 112 is a host processor which is configured to control operation of the host computer 110. The host processor can execute an operating system (OS) or other applications of the host computer 110. In certain embodiments, the host computer 110 may run on or more than one CPU as the host processor, such as two CPUs, four CPUs, eight CPUs, or any suitable number of CPUs.

The memory 114 can be a volatile memory, such as the random-access memory (RAM), for storing the data and information during the operation of the host computer 110.

The BIOS chip 116 is one of the most crucial components in the host computer 110 or any computer system. In certain embodiments, the BIOS chip 116 is a non-volatile memory, such as a flash memory chip, an EEPROM chip or a complementary metal oxide semiconductor (CMOS) memory.

As shown in FIG. 2A, the BIOS chip 116 stores a BIOS software (hereinafter BIOS) 160, a BIOS setting data (BIOSSD) collection 162, a BIOS user interface (UI) 164 and a human interface data (HID) collection 166. The BIOS 160 is configured to perform the startup functions, or the booting functions, for the host computer 110. Examples of the booting functions include, but are not limited to, the initiation and power-on self-test, identifying the system devices, locating the boot loader software on the boot device, loading and executing the boot loader software and giving it control of the operating system (OS). The BIOSSD collection 162 is a BIOSSD collection that includes all data and information related to the BIOS settings.

The BIOS UI 164 is a BIOS console application to provide a user interface for the user at the host computer 110 to change the BIOS setting data in the BIOSSD collection 162. Examples of the BIOS UI 164 may include a web user interface (WUI), a command-line interface (CLI), a common information model (CIM) interface, or any other text mode interface or graphical interface.

The WUI is an interface with a web-based application that provides information to the user (or client) in a web page format. In certain embodiments, the WUI may include a web page and a browser program. The web page may include information stored in the HID collection 166. The browser program is a software application for retrieving, presenting and traversing the information in the web page to the user. For displaying the information such as the web page and other data contents using the browser program, HyperText Markup Language (HTML) is a standardized markup language in a web-based language format. When the browser program is launched, the user may open the web page using the browser program, read the information of the HID collection 166 displayed on the web page, and issue commands through the browser program.

The CLI is an interface with a software program where the user (or client) issues commands to the software program in the form of successive lines of text (command lines). The software program that implements such a text interface is often called a command-line interpreter, a command processor or a "shell", which can be in principle any program that constitutes the user-interface.

The CIM is an open standard defined and published by the Distributed Management Task Force (DMTF). The CIM standard defines how managed elements in an information technology (IT) environment are represented as a common set of objects and relationships between them. This is intended to allow consistent management of these managed elements, independent of their manufacturer or provider. The CIM standard allows multiple parties to exchange management information about these managed elements. Further, the CIM standard not only represents these managed elements and the management information, but also provides means to actively control and manage these elements. By using a common model of information, management software can be written once and work with many implementations of the common model without complex and costly conversion operations or loss of information. One of the features of the CIM standard is the CIM Schema, which is a conceptual schema defining the specific set of objects and relationships between them that represent a common base for the managed elements in an IT environment. The CIM Schema covers most of today's elements in an IT environment, for example computer systems, operating systems, networks, middleware, services and storage. The CIM Schema defines a common basis for representing these managed elements. Since most managed elements have product and vendor specific behavior, the CIM Schema is extensible in order to allow the producers of these elements to represent their specific features seamlessly together with the common base functionality defined in the CIM Schema.

Many vendors provide implementations of CIM in various forms. For example, Microsoft Windows 2000 and newer version provides the Windows Management Instrumentation (WMI) application programming interface (API), which implements the CIM Schema. Some server manufacturers collaborate in the DMTF under the Systems Management Architecture for Server Hardware (SMASH) initiative to define CIM based management of servers. A related standard is Web-Based Enterprise Management (WBEM, also defined by DMTF) which defines a particular implementation of CIM, including protocols for discovering and accessing such CIM implementations.

In certain embodiments, a CIM-XML protocol, which is also standardized by the DMTF, is used as a protocol for performing sending CIM messages on top of HTTP. The CIM-XML protocol includes two message types. One type of the CIM-XML messages relates to the operational messages, which provoke a response from the receiver (RPC). The other type of the CIM-XML messages relates to export messages, which are indications of events.

The HID collection 166 stores a plurality of questions to the user regarding each data in the BIOSSD collection 162, and the corresponding options for each question. For example, one of the BIOS settings in the BIOSSD collection 162 may be the CPU clock rate, which refers to the frequency of the CPU 112. The HID collection 166 may provide a question asking the user about the CPU clock rate, and a plurality of predetermined options of the CPU clock rate. When the BIOS UI 164 displays the question to the user, the user may choose a CPU clock rate from the predetermined options. In certain embodiments, each of the corresponding options includes the name of the corresponding data in the BIOSSD collection 162 (for example, the CPU clock rate) and a value (the frequency of the CPU).

The storage 118 is a data storage media for storing the OS (not shown) and other applications of the host computer 110. Examples of the storage 118 may include flash memory, memory cards, USB drives, hard drives, floppy disks, optical drives, or any other types of data storage devices.

In certain embodiments, the host computer 110 may include at least one I/O device (not shown) for generating and controlling input and output signals of the host computer 110. Examples of the I/O device include keyboards, touch pads, mouse, microphones, display screens, touch screens, or other I/O devices applicable for the host computer 110. Some I/O devices, such as touch screens, are provided for the dual input/output purposes.

In certain embodiments, the CPU 112 of the host computer 110 can operate in a protected mode, which is a native operating mode of the processor, or in a system management mode (SMM). SMM is a special purpose operating mode provided for handling system-wide functions like power management, system hardware control, or proprietary OEMdesigned code. It is intended for use only by system firmware, not by applications software or general-purpose systems software. The main benefit of SMM is that it offers a distinct and easily isolated processor environment that operates transparently to the operating system or executive and software applications.

In certain embodiments, SMM is entered through activation of an external system interrupt pin, which generates a system management interrupt (SMI). The external system interrupt pin is hereinafter referred to as the SMI#. In SMM, the CPU 112 switches to a separate address space while saving the context of the currently running program or task. SMM-specific code may then be executed transparently. Upon returning from SMM, the CPU 112 is placed back into its state prior to the SMI.

Figure 2B:
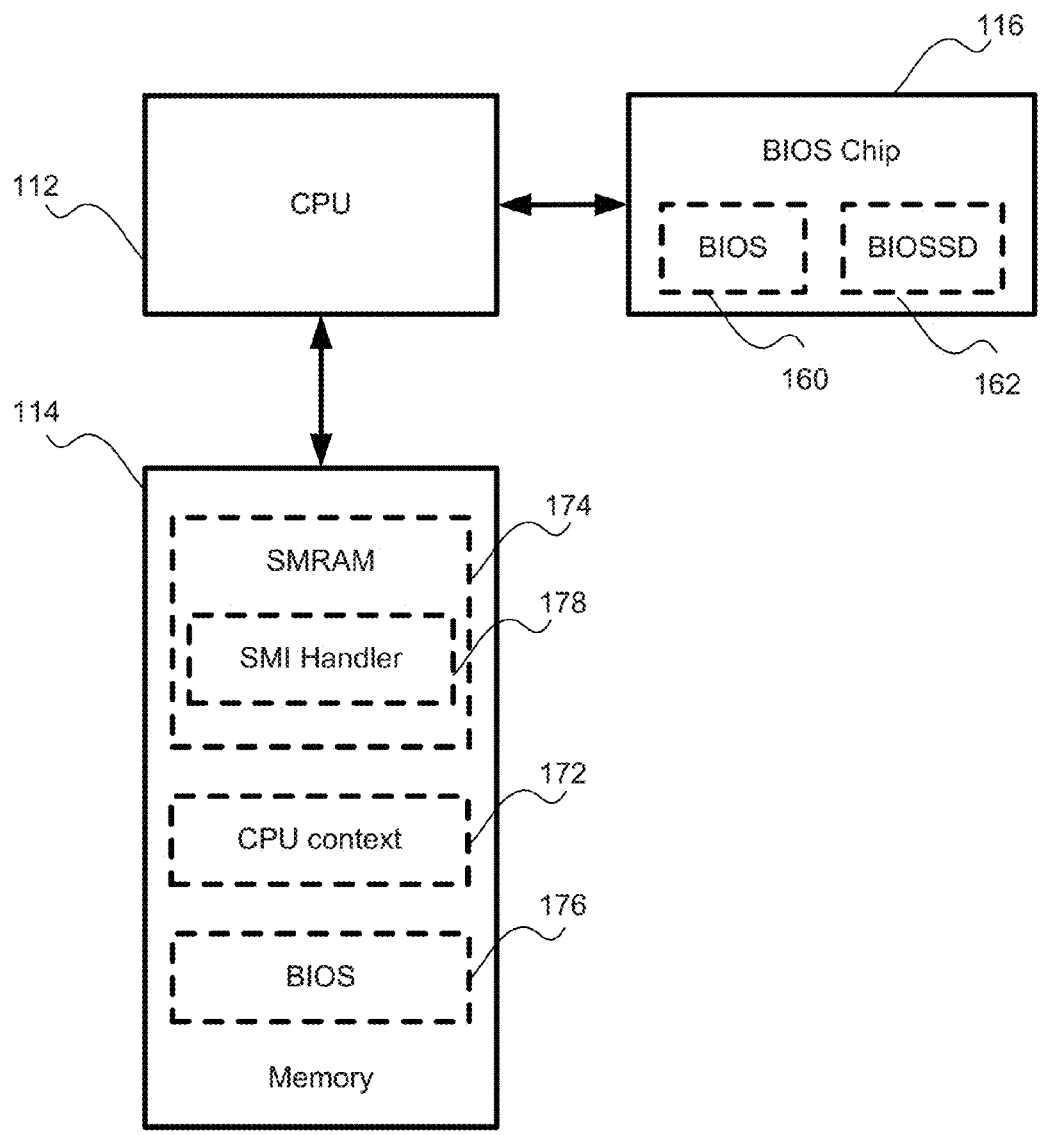
FIG. 2B schematically shows the CPU of the host computer in a system management mode (SMM) according to certain embodiments of the present disclosure.

FIG. 2B schematically shows the CPU of the host computer in the SMM according to certain embodiments of the present disclosure. As shown in FIG. 2B, the CPU 112 is in communication with the memory 114 through a system bus. The memory 114 includes a system management RAM (SMRAM) area 174, and a BIOS area 176. The SMRAM area 174 stores SMI handler codes 178, and includes a CPU context area 169.

In certain embodiments, the BIOS 160 can set up the SMM for the CPU 112. For example, when the BIOS 160 is launched, the CPU 112 loads the BIOS 160 into the BIOS area 176 and executes the BIOS 160. Further, the BIOS 160 can load the SMI handler codes 178 to the SMRAM area 174. The SMI handler 178 is configured to load some or all of the components of the BIOS 160.

When SMM is invoked through the SMI, the CPU 112 saves the current state (i.e. the context) of the processor in the CPU context area 172 of the memory 114, and switches to a separate operating environment contained in the SMRAM area 174. While in SMM, the CPU 112 loads and executes the SMI handler codes 178 to perform operations such as powering down unused disk drives or monitors, executing proprietary code, placing the whole system in a suspended state, or updating the BIOS settings in the BIOS chip 116. Specifically, the SMI handler codes 178 may include a SMM program and an SMM loader program to the area storing the SMI handler codes 178. When the CPU 112 enters the SMM and executes the SMI handler codes 178, the SMM loader program can load the SMM program into the SMRAM area and then transfer control of the CPU 112 to the SMM program.

When the SMI handler has completed its operations, it executes a resume (RSM) instruction. This RSM instruction causes the CPU 112 to reload the saved context in the CPU context area 172, switch back to the protected or real mode, and resume executing the interrupted application or operating system program or task.

The SP 120 refers to a specialized microcontroller that manages the interface between system management software and platform hardware. In certain embodiments, the SP 120 may be a baseboard management controller (BMC). Thus, different types of sensors can be built into the host computer 110, and the SP 120 reads these sensors to obtain parameters such as temperature, cooling fan speeds, power status, OS status, etc.

The SP 120 monitors the sensors and can send alerts to a system administrator at the remote management computer 140 via the network 130 if any of the parameters do not stay within preset limits, indicating a potential failure of the host computer 110. The administrator can also remotely communicate with the SP 120 from the remote management computer 140 via the network 130 to take some corrective action such as resetting or power cycling the host computer 110 to get a hung OS running again.

As shown in FIG. 2A, the SP 120 includes a memory 122 and a non-volatile memory 124. The memory 122 can be a volatile memory, such as the RAM, for storing the data and information during the operation of the SP 120.

The non-volatile memory 124 stores the firmware of the SP 120. As shown in FIG. 2A, the firmware of the SP 120 includes, among other things, a BIOSSD update module 152, a BIOSSD collection 154, a HID collection 156 and a UI server module 158. In certain embodiments, the BIOSSD collection 154 and the HID collection 156 form a BIOS configuration library. In certain embodiments, the firmware may include a web connection module (not shown) for communication with the network 130.

The BIOSSD update module 152 is a program to control the update of the BIOSSD collection 154.

When the BIOS 160 sends an update request to the SP 120 for updating the BIOSSD collection 162 in the BIOS chip 116, the BIOSSD update module 152 may, in response to the update request, transmit a copy of the BIOSSD collection 154 from the SP 120 to the BIOS chip 116 via the KCS interface 170 or the USB interface 180 to replace the BIOSSD collection 162 in the BIOS chip 116.

It should be noted that the operation of the BIOSSD update module 152 is independent from the state of the host computer 110. In other words, the BIOSSD update module 152 enables the OOB update of the BIOSSD collection 154 in the SP 120.

The BIOSSD collection 154 is a BIOSSD collection or a copy of the BIOS settings stored in the non-volatile memory 124 of the SP 120. Generally, when the BIOSSD collection 162 stored in the BIOS chip 116 does not change, the BIOSSD collection 154 is an exact copy of the BIOSSD collection 162.

When the remote UI 144 of the remote management computer 140 sends a command indicating the selected corresponding option to the SP 120, the UI server module 158 receives the command, and changes one of the data of the BIOSSD collection 154 according to the selected corresponding option indicated by the command. Thus, the BIOSSD collection 154 in the SP 120 will be updated without interrupting the operation of the host computer 110.

The HID collection 156 stores the questions to the user regarding each data in the BIOSSD collection 154, and the corresponding options for each question. In certain embodiments, the HID collection 156 can be an exact copy of the HID collection 166 stored in the BIOS chip 116. For example, one of the BIOS settings in the BIOSSD collection 162 may be the CPU clock rate, which refers to the frequency of the CPU 112. The HID collection 166 may provide a question asking the user about the CPU clock rate, and a plurality of predetermined options of the CPU clock rate. When the BIOS UI 164 displays the question to the user, the user may choose a CPU clock rate from the predetermined options. In certain embodiments, each of the corresponding options includes the name of the corresponding data in the BIOSSD collection 162 (for example, the CPU clock rate) and a value (the frequency of the CPU).

In response to the commands from the remote UI 144 of the remote management computer 140 for the information of the HID collection 156, the UI server module 158 retrieves the information from the HID collection 156, and transmits the retrieved information to the remote UI 144 of the remote management computer 140 via the network 130. The retrieved information from the HID collection 156 may include the questions for each data in the BIOSSD collection 154 and the corresponding options for each data.

The UI server module 158 is a server application for the remote UI 144 of the remote management computer 140. In certain embodiments, the UI server module 158 receives a request from the remote UI 144 of the remote management computer 140 to establish a network connection, and in response to the request, sends a response message to the remote UI 144 to establish the network connection. Once the network connection is established, the remote UI 144 of the remote management computer 140 may send commands for the information of the HID collection 156 to the UI server module 158 via the network 130. In response to the commands, the UI server module 158 retrieves the information from the HID collection 156, and sends the retrieved information to the remote UI 144 via the network 130. The retrieved information from the HID collection 156 may include the questions for each data in the BIOSSD collection 154 and the corresponding options for each data. Thus, a user at the remote management computer 140 may use the remote UI 144 to select the corresponding options for each question in order to change the data of the BIOSSD collection 154.

When the UI server module 158 receives a command from the remote UI 144 indicating that the user selects one of the corresponding options for a question to change one of the data of the BIOSSD collection 154, the UI server module 158 changes one of the data of the BIOSSD collection 154 according to the selected corresponding option indicated by the command.

In certain embodiments, the UI server module 158 receives a request from the remote UI 144 of the remote management computer 140 to establish a network connection, and in response to the request, sends a response message to the remote UI 144 to establish the network connection. Once the network connection is established, the remote UI 144 of the remote management computer 140 may send commands for the information of the HID collection 156 to the UI server module 158 via the network. In response to the commands, the UI server module 158 retrieves the information from the HID collection 156, and sends the retrieved information to the remote UI 144 via the network 130. The retrieved information from the HID collection 156 may include the questions for each data in the BIOSSD collection 154 and the corresponding options for each data. Thus, a user at the remote management computer 140 may use the remote UI 144 to select the corresponding options for each question in order to change the data of the BIOSSD collection 154.

When the UI server module 158 receives a command from the remote UI 144 indicating that the user selects one of the corresponding options for a question to change one of the data of the BIOSSD collection 154, the UI server module 158 changes one of the data of the BIOSSD collection 154 according to the selected corresponding option indicated by the command.

As discussed above, the UI server module 158 serves as the server application for the remote UI 144 of the remote management computer 140. Examples of the UI server module 158 may include a web server application, a CLI server application, or a CIM server application.

In certain embodiments, when the WUI is implemented in a client-server structure, the remote UI 144 can be a browser program, and the UI server module 158 can be a web server application. The web server application may retrieve the information of the HID collection 166, and generate a corresponding web page for the WUI to display. As discussed above, the WUI may include a browser program. When the WUI is launched, the browser program may request and receive the web page from the web server application such that the browser program may display the web page to the user.

Figure 2C:
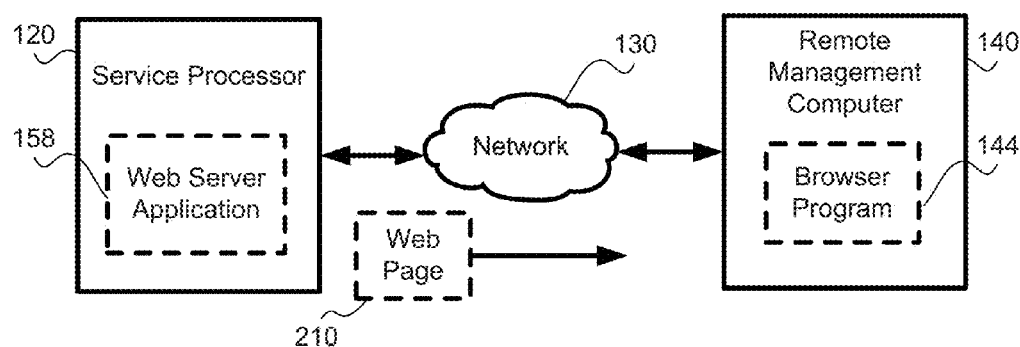
FIG. 2C schematically shows a client-server WUI according to certain embodiments of the present disclosure.

FIG. 2C schematically shows a client-server WUI according to certain embodiments of the present disclosure. As shown in FIG. 2C, when the WUI is implemented in a client-server structure, the remote UI 144 at the remote management computer 140 is a browser program, and the UI server module 158 at the SP 120 is a web server application. The web server application 158 may generate a web page 210, which may be transmitted from the web server application 158 to the browser program 144 through the under the Hypertext Transfer Protocol (HTTP). Specifically, the browser program 144 on the remote management computer 140 may attempt to create a connection to the web server application 158 by sending a HTTP request to the server to establish a transmission connection protocol (TCP) connection to a particular port (generally port 80) of the SP 120. Upon receiving the HTTP request, the web server application 158 sends a response message in response to the HTTP request to the browser program 144 to establish the HTTP connection. When the browser program 144 receives the response message, the web-based connection is established. For example, one of the commonly used HTTP requests includes a GET instruction, which is used by the browser program 144 for retrieving data from the web server application 158. When the HTTP request includes the GET instruction, contents requested by the GET instruction would be included in the response message. The contents may include resources such as the web page 210 in the HTML file format and other contents requested by the browser program 144. Transmission of the contents in the response message may take certain periods of time. When the contents of the response message include instructions for the browser program 144 to perform an action, such as a web page 210 and an instruction to display the web page 210, the browser program 144 proceed with the contents in the response message, e.g. displaying the web page 210 on the I/O device of the remote management computer 140. When transmission of the response message ends, the web-based connection is closed. Specifically, the response message for the HTTP request would include a connection end message at the end, indicating that the web-based connection is closed.

In certain embodiments, when the CLI is implemented in a client-server structure, the remote UI 144 can be a text-based client program, and the UI server module 158 can be a text-based server application in communication with the remote UI 144 through text-based protocols. Examples of the text-based protocols include telnet or secure shell (SSH). The text-based server application may retrieve the information of the HID collection 166, and send the information to the client application through the telnet or SSH protocols.

Figure 2D:
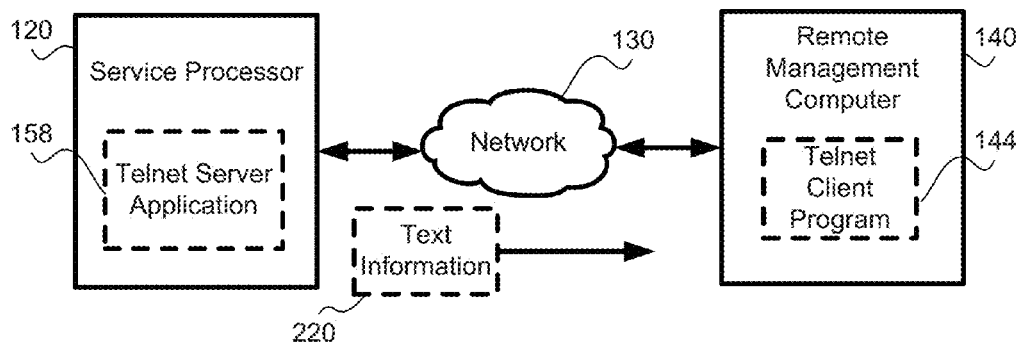
FIG. 2D schematically shows a client-server CLI according to certain embodiments of the present disclosure.

FIG. 2D schematically shows a client-server CLI according to certain embodiments of the present disclosure. As shown in FIG. 2D, when the CLI is implemented in a client-server structure through the telnet protocol, the remote UI 144 at the remote management computer 140 is a telnet client program, and the UI server module 158 at the SP 120 is a telnet server application. Specifically, the telnet client program 144 at the remote management computer 140 may attempt to create a connection to the server by sending a request to the telnet server application 158 to establish a TCP connection to a particular telnet port (for telnet, generally port 23, and for SSH, generally port 22) of the SP 120.

Upon receiving the request, the telnet server application 158 sends a response message in response to the request to the telnet client program 144 to establish the telnet connection. Thus, the telnet server application 158 may send text information to the telnet client program 144 for displaying to the user. When the user uses the telnet client program 144 at the remote management computer 140 to input the text instructions, the telnet client program 144 transmits to the telnet server application 158 corresponding commands related to the text instructions, and performs the commands at the telnet server application 158.

In certain embodiments, when the CIM is implemented in a client-server structure, the remote UI 144 can be a CIM client program, and the UI server module 158 can be a CIM server application in communication with the remote UI 144 through the CIM schema, such as the CIM-XML protocol. As discussed above, many vendors provide implementations of CIM in various forms. For example, Microsoft Windows 2000 and newer version provides the Windows Management Instrumentation (WMI) application programming interface (API), which implements the CIM Schema. Some server manufacturers collaborate in the DMTF under the Systems Management Architecture for Server Hardware (SMASH) initiative to define CIM based management of servers. A related standard is Web-Based Enterprise Management (WBEM, also defined by DMTF) which defines a particular implementation of CIM, including protocols for discovering and accessing such CIM implementations.

In certain embodiments, a CIM-XML protocol, which is also standardized by the DMTF, is used as a protocol for performing sending CIM messages on top of HTTP. The CIM-XML protocol includes two message types. One type of the CIM-XML messages relates to the operational messages, which provoke a response from the receiver (RPC). The other type of the CIM-XML messages relates to export messages, which are indications of events.

Figure 2E:
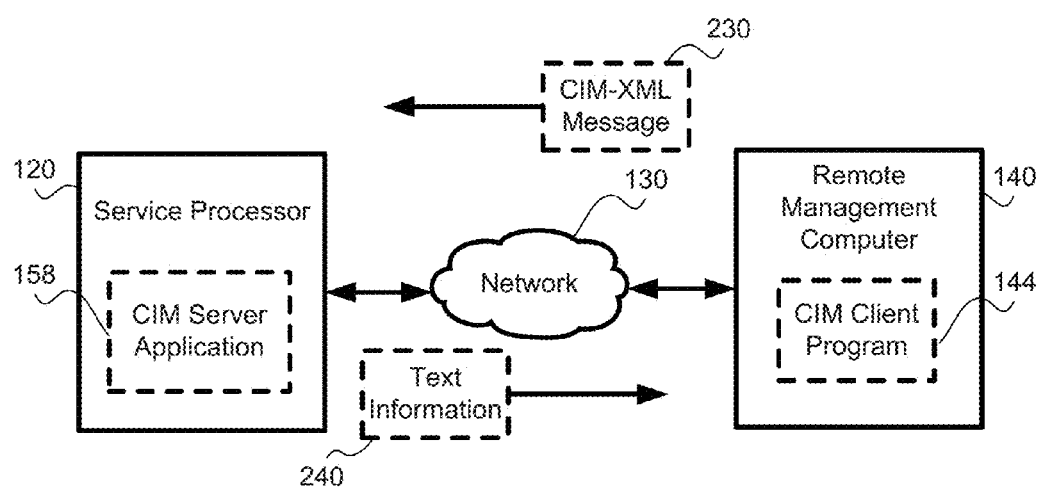
FIG. 2E schematically shows a client-server CIM according to certain embodiments of the present disclosure.

FIG. 2E schematically shows a client-server CIM according to certain embodiments of the present disclosure. As shown in FIG. 2E, when the CIM is implemented in a client-server structure through the telnet protocol, the remote UI 144 at the remote management computer 140 is a CIM client program, and the UI server module 158 at the SP 120 is a CIM server application. The CIM interface may be implemented through the predetermined protocols, such as the CIM-XML protocol. The operation of the CIM interface under the CIM-XML protocol is similar to the WUI. Specifically, the CIM client program 144 may attempt to create a connection to the CIM server application 158 by sending a CIM-XML operational message as a request to the CIM server application 158 to establish a transmission connection protocol (TCP) connection of the CIM server application 158. Upon receiving the request, the CIM server application 158 sends an export message in response to the HTTP request to the CIM client program 144 to establish the HTTP connection. When the CIM client program 144 receives the response message, the CIM-XML web-based connection is established. The CIM interface on the CIM client program 144 may then send operational messages 230, such as a GET class instruction, for retrieving data from the CIM server application 158. When the operational message includes the GET class instruction, contents requested by the GET class instruction would be included in the response export message.

The remote management computer 140 can be a local mobile device serving as the client device of the system 100, which is subject to receive actions from the user. As shown in FIGS. 1 and 2A, the remote management computer 140 is remotely connected to the SP 120 of the host computer 110 via the network 130. One of ordinary skill in the art would appreciate that the system 100 may include a plurality of remote management computer 140. Examples of the remote management computer 140 may include, for example, portable devices such as smartphones, tablets or other mobile computer devices.

As shown in FIG. 2A, the remote management computer 140 includes a storage 142. Although not explicitly shown in FIGS. 1 and 2A, the remote management computer 140 may have a baseboard with a CPU and a memory embedded thereon, and at least one I/O device, such that the remote management computer 140 is operable independently without being connected to the SP 120 of the host computer 110.

The storage 142 is a data storage media for storing the OS (not shown) and other applications of the remote management computer 140. Examples of the storage 142 may include flash memory, memory cards, USB drives, hard drives, floppy disks, optical drives, or any other types of data storage devices. As shown in FIG. 2A, the storage 142 stores a remote UI 144.

The remote UI 144 is an application program to provide a user interface for the user at the remote management computer 140 to change the BIOS setting data in the BIOSSD collection 154 stored in the SP 120. In certain embodiments, the remote UI 144 serves as the client application for the BIOSSD update module 152 of the SP 120. Examples of the remote UI 144 may include a WUI client application (such as a browser program), a CLI client application (such as a telnet or SSH application), a CIM client application, or any other text mode interface or graphical interface client application. In certain embodiments, the remote UI 144 provides a user interface which is same as or similar to the interface provided by the BIOS UI 164.

When the remote UI 144 is launched, the remote UI 144 sends a request to the SP 120 to establish a network connection. When the remote UI 144 receives a response message from the UI server module 158 in response to the request, the network connection is established. Once the network connection is established, the remote UI 144 of the remote management computer 140 may send commands for the information of the HID collection 156 to the UI server module 158 via the network. In response to the commands, the UI server module 158 may retrieve the information from the HID collection 156, and sends the retrieved information to the remote UI 144 via the network 130. The retrieved information from the HID collection 156 may include the questions for each data in the BIOSSD collection 154 and the corresponding options for each data. When the remote UI 144 receives the retrieved information, the remote UI 144 may display the questions and the corresponding options to a user at the remote management computer 140. Thus, the user may use the remote UI 144 to select one or more of the corresponding options in response to the questions. Once the user selects a corresponding option, the remote UI 144 may send a command based on the selected corresponding option to the SP 120 via the network 130.

The KCS interface 170 is an interface often used between a SP and a payload processor in the Intelligent Platform Management Interface (IPMI) architecture. IPMI is an industry standard for system monitoring and event recovery. The IPMI specification provides a common message-based interface for accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a SP through an operating system or through an external connection, such as through a network or serial connection. Additional details regarding IPMI can be found in the IPMI Specification (Version 2.0), which is publicly available from INTEL CORPORATION, and which is incorporated herein by reference.

In certain embodiments, a user may use IPMI original equipment manufacturer (OEM) messages to control data transmission via the KCS interface 170. Specifically, in addition to the standard predefined commands and parameters, IPMI allows OEM extensions for the manufacturers and users to define OEM specific commands. In certain embodiments, the IPMI OEM messages may be used for transmission of the BIOSSD collections between the BIOS chip 116 and the SP 120.

The USB interface 180 is an industry standardized interface for the connection of computer peripherals. In certain embodiments, the USB interface 180 is a USB port. In certain embodiments, the firmware of the SP 120 may include a USB emulation module to emulate a USB drive, which is virtually connected to the USB interface 180. Thus, when the host computer 110 attempts to access the emulated USB drive, the CPU 112 instructs the USB interface 180 to access the USB emulation module of the SP 120.

Figure 3:
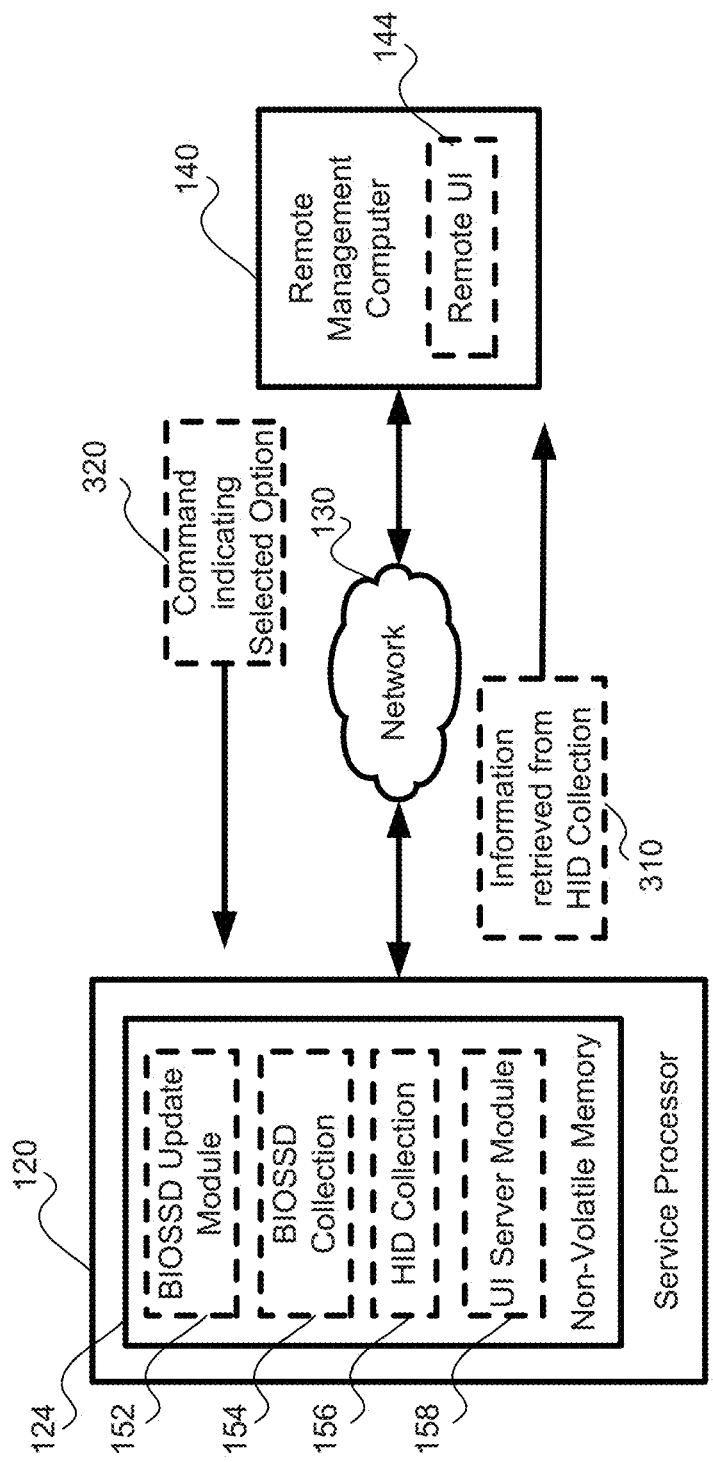
FIG. 3 schematically depicts out-of-band configuring BIOSSD according to certain embodiments of the present disclosure.
Figure 4A:
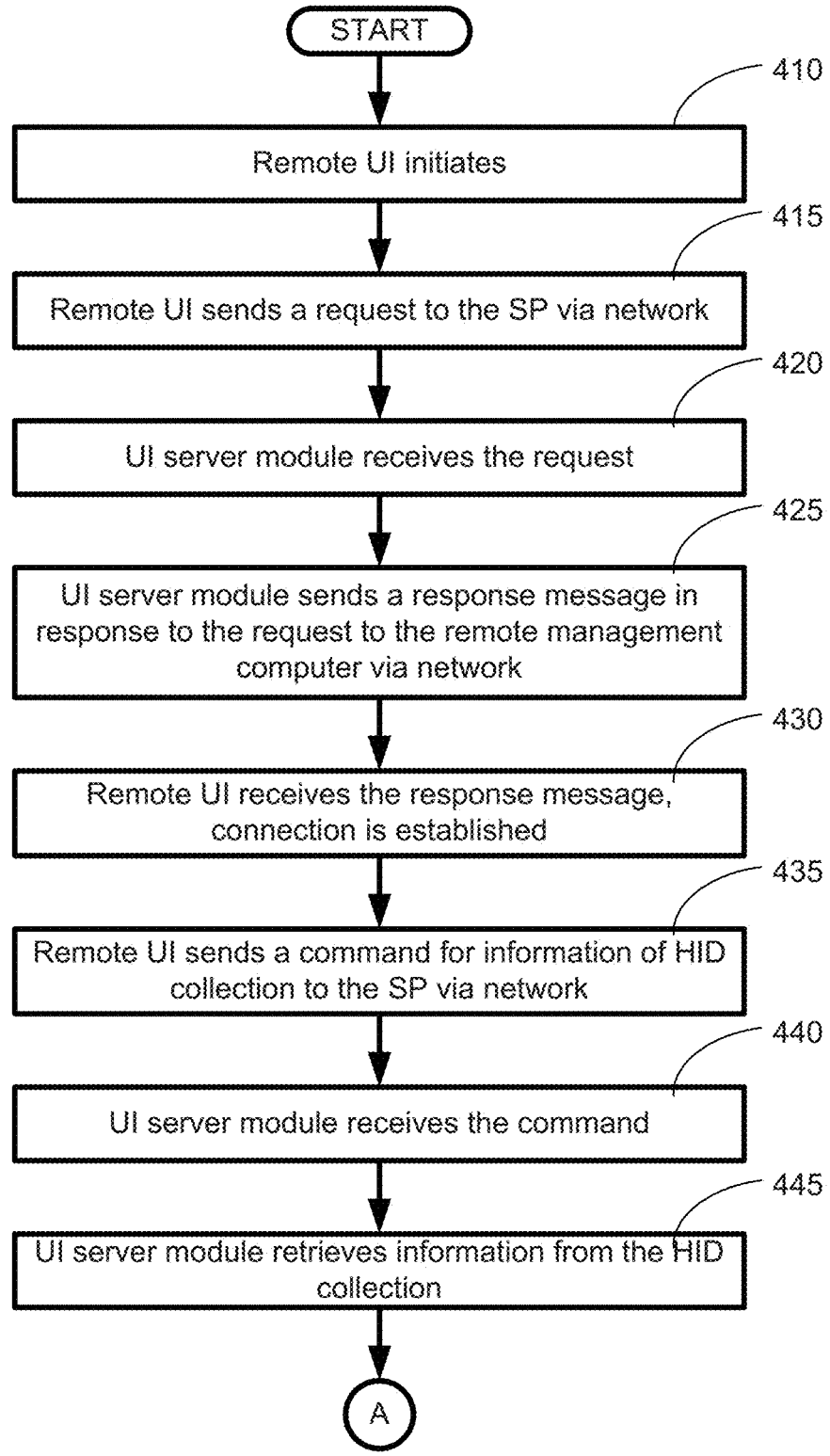
FIGS. 4A and 4B show a flowchart of data transmission between the service processor and the remote management computer of FIG. 3 according to certain embodiments of the present disclosure.
Figure 4B:
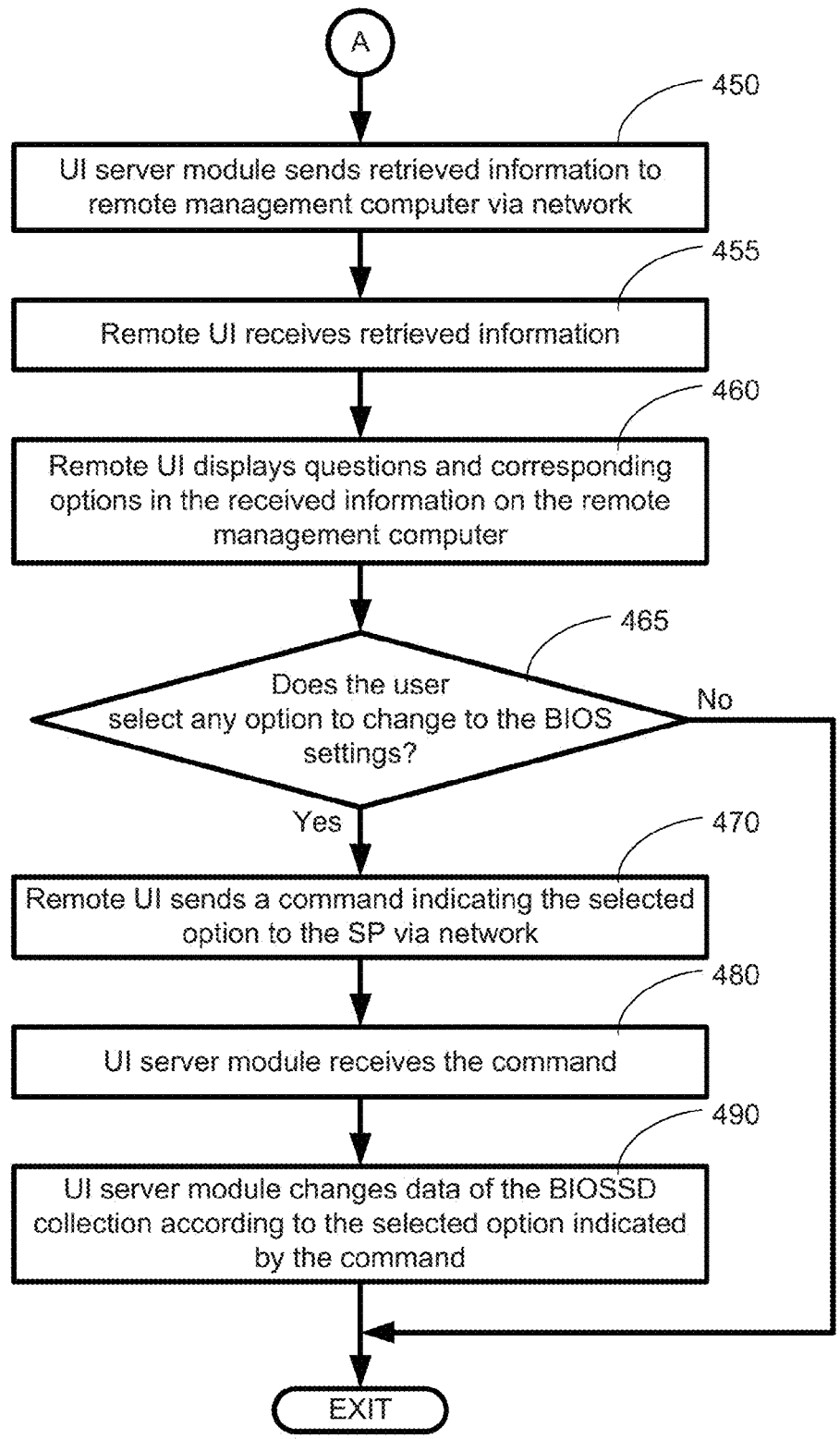

FIG. 3 schematically depicts out-of-band configuring BIOSSD according to certain embodiments of the present disclosure, and FIGS. 4A and 4B show a flowchart of data transmission between the service processor and the remote management computer of FIG. 3 according to certain embodiments of the present disclosure.

As shown in FIG. 3, the remote management computer 140 is connected to the SP 120 via the network 130. In certain embodiments, data transmission between the SP 120 and the remote management computer 140 may be under the Internet protocols, such as the TCP-IP protocol.

In certain embodiments, the remote UI 144 of the remote management computer 140 and the UI server module 158 of the SP 120 constitute a client-server structure of the user interface. Examples of the user interface may include a WUI, a CLI, a CIM interface, or any other text mode interface or graphical interface. For example, when WUI is used as the user interface, the UI server module 158 can be a web server application generating and transmitting the web page, and the remote UI 144 can be a browser program receiving and displaying the web page. When CLI is used, the UI server module 158 can be a telnet or SSH server application providing text based information, and the remote UI 144 can be a telnet or SSH client program sending and receiving text based commands.

As discussed above, a user at the remote management computer 140 may attempt to change the BIOS settings remotely without interrupting the operation of the host computer 110. To achieve such goal, the user may remotely change the BIOSSD collection 154 stored in the SP 120 without changing the actual BIOS settings of the BIOSSD collection 162 in the BIOS chip.

Referring to FIG. 4A, at procedure 410, the remote UI 144 initiates. In certain embodiments, the remote management computer 140 may download the remote UI 144 from a web server, such as the web server at the SP 120, and stores the remote UI 144 in the storage 142. Then the remote management computer 140 may execute the remote UI 144 for initiation.

At procedure 415, the remote UI 144 sends a command to the SP 120 via the network 130 to establish the network connection. For example, when WUI is used, the remote UI 144, which is a browser program, may attempt to create a connection to the web server application (the UI server module 158) by sending a HTTP request to the SP 120 to establish a transmission connection protocol (TCP) connection to a particular port (generally port 80) of the server. When CLI is used, the remote UI 144, which is a telnet or SSH program, may attempt to create a connection to the server (the BIOSSD update module 152) by sending a request to the server to establish a TCP connection to a particular port (for telnet, generally port 23, and for SSH, generally port 22) of the server.

At procedure 420, the UI server module 158 (i.e., the web server application) receives the request from the remote UI 144. Upon receiving the request, at procedure 425, the BIOSSD update module 152 responds to the request by sending a response message to the remote management computer 140 via the network 130. At procedure 430, the remote UI 144 receives the response message, and the connection is established.

At procedure 435, the remote UI 144 sends a command for the information of the HID collection 156 to the SP 120 via the network 130. At procedure 440, the UI server module 158 receives the command. At procedure 445, the UI server module 158 retrieves the information from the HID collection 156 according to the command. The retrieved information from the HID collection 156 may include the questions for each data in the BIOSSD collection 154 and the corresponding options for each data.

Referring to FIG. 4B, at procedure 450, the UI server module 158 sends the retrieved information (310 of FIG. 3) from the HID collection 156 to the remote management computer 140 via the network 130. At procedure 455, the remote UI 144 receives the retrieved information 310.

Once the remote UI 144 receives the information 310, at procedure 460, the remote UI 144 displays the questions and the corresponding options in the received information 310 on the remote management computer 140 such that the user may read the questions and select the corresponding options accordingly.

At procedure 465, the remote UI 144 determines whether the user has selected any of the corresponding options to change the BIOS settings. If the user does not select any corresponding option, the remote UI 144 ends the update process. If the user selects one or more corresponding options, the remote UI 144 enters procedure 470.

At procedure 470, the remote UI 144 sends to the SP 120 via the network 130 a command (320 of FIG. 3) indicating the selected option. At procedure 480, the UI server module 158 receives the command. At procedure 490, the UI server module 158 updates the BIOSSD collection 154 by changing one of the data of the BIOSSD collection 154 according to the selected option indicated by the command. Thus, the BIOSSD collection 154 has been changed without interrupting the operation of the host computer 110.

When the BIOS 160 sends an update request to the SP 120 for updating the BIOSSD collection 162 in the BIOS chip 116, the BIOSSD update module 152 may transmit a copy of the BIOSSD collection 154 from the SP 120 to the BIOS chip 116 via the KCS interface 170 or the USB interface 180 to replace the BIOSSD collection 162 in the BIOS chip 116. In certain embodiments, the BIOSSD update module 152 transmits a copy of the BIOSSD collection 154 from the SP 120 to the BIOS chip 116 only when the BIOSSD collection 154 is updated. In other words, if the user does not remotely change the BIOSSD collection 154, the BIOSSD update module 152 does not transmit a copy of the unchanged BIOSSD collection 154 from the SP 120 to the BIOS chip 116.

In certain embodiments, the BIOS 160 may send the update request to the SP 120 during the startup process of the BIOS chip. In certain embodiments, the host computer 110 is powered up, and the CPU 112 loads and executes the BIOS 160. Then the BIOS 160 sends the update request to the SP 120.

In certain embodiments, the BIOS 160 may send the update request to the SP 120 during the SMM. In certain embodiments, the host computer 100 boots up and executes the OS. The OS can include a BIOSSD update program. The BIOSSD update program can initiate an SMI and trigger the CPU 112 to enter the SMM. When the CPU 112 executes in the SMM, the CPU 112 executes the SMI handler 168 stored in the SMRAM area 164. The SMI handler 168, in turn, loads and executes some or all components of the BIOS 160. Then the BIOS 160 enters procedure 410.

As discussed above, the configuring process of BIOSSD is an OOB process. In other words, the user at the remote management computer 140 may remotely perform the OOB BIOSSD replicating process independent from the current operation states of the host computer 110. The process can be performed even when the OS is running at the host computer 110, or when the host computer 110 is powered off.

The method as described in the embodiments of the present disclosure can be used in the field of, but not limited to, OOB configuring BIOS settings in a computer system. In certain embodiments, the method is performed remotely without accessing the console of the host computer 110.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system for out-of-band configuring BIOS setting data (BIOSSD), comprising:
    a host computer, comprising a BIOS chip, wherein the BIOS chip stores a first BIOSSD collection;
    a service processor (SP), connected to the host computer via an interface, wherein the SP comprises a non-volatile memory storing a firmware, a second BIOSSD collection, and a human interface data (HID) collection different from the second BIOSSD collection, wherein the second BIOSSD collection comprises a plurality of data, and the HID collection comprises a plurality of questions for the data of the second BIOSSD collection and a plurality of corresponding options for each question; and
    a remote management computer connected to the SP via a network and comprising a remote user interface (UI);
    wherein the firmware is configured, when executed, to
        receive a connection request from the remote management computer to establish a network connection;
        in response to the connection request, transmit a response message to the remote management computer via the network to establish the network connection;
        receive an information request from the remote management computer for the questions and the corresponding options of the HID collection;
        in response to the information request, retrieve the questions and the corresponding options from the HID collection, and transmit the retrieved questions and corresponding options to the remote management computer via the network;
        receive a command from the remote management computer indicating a selected corresponding option;
        in response to the command, change one of the data of the second BIOSSD collection according to the selected corresponding option indicated by the command; and
        in response to a BIOSSD update request from the host computer, transmit a copy of the second BIOSSD collection to the BIOS chip via the interface to replace the first BIOSSD collection in the BIOS chip;
    wherein the remote UI is configured to:
        send the connection request to the SP via the network;
        receive the response message from the SP via the network to establish the network connection;
        send the information request to the SP via the network;
        receive the retrieved questions and corresponding options from the SP via the network;
        display the received questions and corresponding options at the remote management computer;
        receive the selected corresponding option at the remote management computer; and
        send the command from the remote management computer indicating a selected corresponding option.

2. The system as claimed in claim 1, wherein the BIOS chip stores a BIOS, configured to send the BIOSSD update request to the SP for the second BIOSSD collection.

3. The system as claimed in claim 1, wherein the BIOS chip stores a BIOS HID collection independent and separate from the first BIOSSD collection, wherein the BIOS HID collection is an exact copy of the HID collection.

4. The system as claimed in claim 1, wherein the remote UI is a browser program, a telnet client program, a secure shell (SSH) client program, or a common information model (CIM) interface client program.

5. The system as claimed in claim 1, wherein the firmware comprises a UI server module configured, when executed, to
    receive the connection request from the remote UI via the network;
    in response to the connection request, transmit the response message to the remote UI via the network;
    receive the information request from the remote UI via the network for the questions and the corresponding options of the HID collection;
    in response to the information request, retrieve the questions and the corresponding options from the HID collection, and transmit the retrieved questions and corresponding options to the remote UI via the network;
    receive the command from the remote UI via the network indicating the selected corresponding option; and in response to the command, change the one of the data of the second BIOSSD collection according to the selected corresponding option indicated by the command.

6. The system as claimed in claim 5, wherein the UI server module is a web server program, a telnet server program, a secure shell (SSH) server program, or a common information model (CIM) interface server program.

7. The system as claimed in claim 1, wherein the firmware comprises a BIOSSD update module configured, when executed, to
in response to the BIOSSD update request from the host computer, transmit a copy of the second BIOSSD collection to the BIOS chip via the interface to replace the first BIOSSD collection in the BIOS chip.

8. The system as claimed in claim 1, wherein the interface is a keyboard controller style (KCS) interface or a universal serial bus (USB) interface.

9. The system as claimed in claim 1, wherein the SP is a baseboard management controller (BMC).

10. A method of out-of-band configuring BIOS setting data (BIOSSD), comprising:
receiving, at a service processor (SP), a connection request from a remote management computer to establish a network connection, wherein the remote management computer is connected to the SP via a network and comprises a remote user interface (UI), and the SP is connected to a host computer via an interface;
in response to the connection request, transmitting, at the SP, a response message to the remote management computer via the network to establish the network connection;
receiving, at the SP, an information request from the remote management computer for a plurality of questions and a plurality of corresponding options for each question of a human interface data (HID) collection, wherein the host computer comprises a BIOS chip storing a first BIOSSD collection, wherein the SP stores a second BIOSSD collection and the HID collection, wherein the HID collection is different from the second BIOSSD collection, the second BIOSSD collection comprises a plurality of data, and the HID collection comprises the plurality of questions for the data of the second BIOSSD collection and the corresponding options for each question;
in response to the information request, retrieving, at the SP, the questions and the corresponding options from the HID collection, and transmitting the retrieved questions and corresponding options to the remote management computer via the network;
receiving, at the SP, a command from the remote management computer indicating a selected corresponding option;
in response to the command, changing, at the SP, one of the data of the second BIOSSD collection according to the selected corresponding option indicated by the command; and
in response to a BIOSSD update request from the host computer, transmitting, at the SP, a copy of the second BIOSSD collection to the BIOS chip of the host computer via the interface to replace the first BIOSSD collection in the BIOS chip;
wherein the remote UI is configured to:
send the connection request to the SP via the network;
receive the response message from the SP via the network to establish the network connection;
send the information request to the SP via the network;
receive the retrieved questions and corresponding options from the SP via the network;
display the received questions and corresponding options at the remote management computer;
receive the selected corresponding option at the remote management computer; and
send the command from the remote management computer indicating a selected corresponding option.

11. The method as claimed in claim 10, wherein the BIOS chip stores a BIOS, configured to send the BIOSSD update request to the SP for the second BIOSSD collection.

12. The method as claimed in claim 10, wherein the BIOS chip stores a BIOS HID collection independent and separate from the first BIOSSD collection, wherein the BIOS HID collection is an exact copy of the HID collection.

13. The method as claimed in claim 10, wherein the remote UI is a browser program, a telnet client program, a secure shell (SSH) client program, or a common information model (CIM) interface client program.

14. The method as claimed in claim 13, wherein the SP stores a UI server module configured, when executed, to
receive the connection request from the remote UI via the network;
in response to the connection request, transmit the response message to the remote UI via the network;
receive the information request from the remote UI via the network for the questions and the corresponding options of the HID collection;
in response to the information request, retrieve the questions and the corresponding options from the HID collection, and transmit the retrieved questions and corresponding options to the remote UI via the network;
receive the command from the remote UI via the network indicating the selected corresponding option; and
in response to the command, change the one of the data of the second BIOSSD collection according to the selected corresponding option indicated by the command.

15. The method as claimed in claim 14, wherein the UI server module is a web server program, a telnet server program, a secure shell (SSH) server program, or a common information model (CIM) interface server program.

16. The method as claimed in claim 10, wherein the interface is a keyboard controller style (KCS) interface or a universal serial bus (USB) interface.

17. The method as claimed in claim 10, wherein the SP is a baseboard management controller (BMC).

18. A non-transitory computer readable medium storing computer executable codes, wherein the codes, when executed at a processor, are configured to
receive, at a service processor (SP), a connection request from a remote management computer to establish a network connection, wherein the remote management computer is connected to the SP via a network and comprises a remote user interface (UI), and the SP is connected to a host computer via an interface;
in response to the connection request, transmit, at the SP, a response message to the remote management computer via the network to establish the network connection;
receive, at the SP, an information request from the remote management computer for a plurality of questions and a plurality of corresponding options for each question of a human interface data (HID) collection, wherein the host computer comprises a BIOS chip storing a first BIOSSD collection, wherein the SP stores a second BIOSSD collection and the HID collection, wherein the HID collection is different from the second BIOSSD collection, the second BIOSSD collection comprises a plurality of data, and the HID collection comprises the plurality of questions for the data of the second BIOSSD collection and the corresponding options for each question;

in response to the information request, retrieve, at the SP, the questions and the corresponding options from the HID collection, and transmit the retrieved questions and corresponding options to the remote management computer via the network;

receive, at the SP, a command from the remote management computer indicating a selected corresponding option;

in response to the command, change, at the SP, one of the data of the second BIOSSD collection according to the selected corresponding option indicated by the command; and in response to a BIOSSD update request from the host computer, transmit, at the SP, a copy of the second BIOSSD collection to the BIOS chip of the host computer via the interface to replace the first BIOSSD collection in the BIOS chip;

wherein the remote UI is configured to:
send the connection request to the SP via the network;
receive the response message from the SP via the network to establish the network connection;
send the information request to the SP via the network;
receive the retrieved questions and corresponding options from the SP via the network;
display the received questions and corresponding options at the remote management computer;
receive the selected corresponding option at the remote management computer; and
send the command from the remote management computer indicating a selected corresponding option.

19. The non-transitory computer readable medium as claimed in claim 18, wherein the BIOS chip stores a BIOS, configured to send the BIOSSD update request to the SP for the second BIOSSD collection.

20. The non-transitory computer readable medium as claimed in claim 18, wherein the BIOS chip stores a BIOS HID collection independent and separate from the first BIOSSD collection, wherein the BIOS HID collection is an exact copy of the HID collection.

21. The non-transitory computer readable medium as claimed in claim 18, wherein the remote UI is a browser program, a telnet client program, a secure shell (SSH) client program, or a common information model (CIM) interface client program.

22. The non-transitory computer readable medium as claimed in claim 21, wherein the codes comprise a UI server module configured, when executed, to
receive the connection request from the remote UI via the network;
in response to the connection request, transmit the response message to the remote UI via the network;
receive the information request from the remote UI via the network for the questions and the corresponding options of the HID collection;
in response to the information request, retrieve the questions and the corresponding options from the HID collection, and transmit the retrieved questions and corresponding options to the remote UI via the network; and
receive the command from the remote UI via the network indicating the selected corresponding option.

23. The non-transitory computer readable medium as claimed in claim 22, wherein the UI server module is a web server program, a telnet server program, a secure shell (SSH) server program, or a common information model (CIM) interface server program.

24. The non-transitory computer readable medium as claimed in claim 18, wherein the codes comprise a BIOSSD update module configured, when executed, to
in response to the BIOSSD update request from the host computer, transmit a copy of the second BIOSSD collection to the BIOS chip via the interface to replace the first BIOSSD collection in the BIOS chip.

25. The non-transitory computer readable medium as claimed in claim 18, wherein the interface is a keyboard controller style (KCS) interface or a universal serial bus (USB) interface.

26. The non-transitory computer readable medium as claimed in claim 18, wherein the SP is a baseboard management controller (BMC).

* * * * *